(12) United States Patent
Olstad et al.

(10) Patent No.: US 7,038,639 B1
(45) Date of Patent: May 2, 2006

(54) DISPLAY SYSTEM FOR FULL FACE MASKS

(75) Inventors: William Olstad, Panama City, FL (US); Dennis Gallagher, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 436 days.

(21) Appl. No.: 10/457,700

(22) Filed: Jun. 9, 2003

(51) Int. Cl.
*G09G 5/00* (2006.01)

(52) U.S. Cl. ......................................................... 345/8

(58) Field of Classification Search ................ 345/7–8; 2/5, 421–425, 6.1–6.5
See application file for complete search history.

(56) References Cited

U.S. PATENT DOCUMENTS

| | | | | |
|---|---|---|---|---|
| 5,601,078 A | * | 2/1997 | Schaller et al. | 128/205.23 |
| 6,137,457 A | * | 10/2000 | Tokuhashi et al. | 345/8 |
| 6,567,220 B1 | * | 5/2003 | McDonald et al. | 359/630 |
| 2003/0115010 A1 | * | 6/2003 | Estep | 702/127 |

FOREIGN PATENT DOCUMENTS

EP    0252281    *    1/1988

* cited by examiner

*Primary Examiner*—Sumati Lefkowitz
*Assistant Examiner*—Rodney Amadiz
(74) *Attorney, Agent, or Firm*—James T. Shepherd (57) ABSTRACT

A method and system displays information in a full face mask. A display module is mounted inside the full face mask on faceplate support structure outside of a forward viewing area of a faceplate portion. The display module is located to be free of interference with an operator's forward field of view through the forward viewing area. A display control module is externally mounted on outside components of the full face mask and has a waterproof housing, processing and display driving electronics, memory, internal sensors, external sensors, and battery. A power-data cable is connected to the display control module externally mounted on the full face mask and to the display module inside the full face mask via an accessory interface plate. A switch on the display control module can be accessed and selectably actuated by an operator to present data from the display control module on the display module.

10 Claims, 7 Drawing Sheets

FIG. 7

DISPLAY SYSTEM FOR FULL FACE MASKS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to displays for full face masks. More particularly, this invention is to a display system and method for a full face mask that allows the operator (e.g. diver, firefighter) to see data from multiple sources at a single location regardless of environmental conditions and physical constraints upon the operator and without substantially obstructing the operator's field of view.

Tasks that need to be performed by personnel under hazardous conditions e.g., diving operations or fighting fires, frequently have the operators at least partially protected by life-supporting full face masks (FFM). These operators wearing FFMs are typically required to visually acquire and monitor information from numerous separate data sources (e.g. gauges, indicators, maps, technical drawings and other databases) that can be remotely located and normally not available for immediate viewing. Effective acquisition of data is essential for survival and effective performance of missions in the extremely dangerous environments associated with diving, firefighting, etc. These activities, even in ideal conditions, can be time consuming and distracting to cause inefficient and possibly unsafe actions. In extreme environments, where the data sources are not readable due to high turbidity, low light, smoke, etc. or access to the data sources is hampered by physical restrictions, the operator's safety and the mission's outcome can be doubtful.

One commercially available FFM that is widely used in diving (military, commercial, search & rescue, police) throughout the world is the DIVATOR MK II (previously known as the AGA FFM). Previous display systems that present data to the operator using this FFM have been large and bulky, and mounted externally to the FFM. Some of the prior art display systems used with this FFM severely compromise the operator's field of view, can be difficult or impossible to align for easy viewing, and can be easily knocked off the mask or become entangled.

Thus, in accordance with this inventive concept, a need has been recognized in the state of the art for a display method and system for FFMs to allow clear and easy viewing of data without eye-strain by simply looking to an adjustable optical element inside the FFM that magnifies and focuses the data at a comfortable viewing distance under ambient conditions that would otherwise make this difficult or impossible.

OBJECTS AND SUMMARY OF THE INVENTION

An object of the invention is to provide a method and system for displaying inside an FFM for appraisal of data from several sources.

Another object of the invention is to provide a method and system for displaying in an FFM that places a small adjustable display module inside the mask to present the data the operator needs.

Another object of the invention is to provide a method and system for displaying in an FFM that provides easy access simply by glancing down at display optics in the FFM regardless of the environmental conditions and physical restrictions.

Another object of the invention is to provide a method and system for displaying in an FFM having a display control module located according to operator preference such that it does not interfere with operations yet is accessible for operator-control of the display module.

Another object of the invention is to provide a method and system for displaying in an FFM that can be added as a retro-fit to allow benefits of the invention for current users of the other FFM systems.

Another object of the invention is to provide a method and system for displaying in an FFM that is easily viewable and adjustable, has a compact display module placed in the corner of the mask, and lets the operator see the needed data regardless of environmental conditions, without sacrificing field of view, and without having a bulky module attached to the outside of the mask frame.

Another object of the invention is to provide a method and system for displaying in an FFM by a completely enclosed display module, and a low profile external display control module to reduce the possibility of snagging as compared to bulky, externally mounted display systems.

Another object of the invention is to provide a method and system for displaying in an FFM having an adjustable optical alignment capability for a display module to accommodate anthropometrical differences between operators [i.e. variety of face shapes and sizes which affect mask fit, as well as varying interpupillary distances for different operators].

Another object of the invention is to provide a method and system for displaying in an FFM having a display/optical module of small size that is placed to minimally interfere with an operator's field of view.

Another object of the invention is to provide a method and system for displaying in an FFM using a remotely located display control module that can be mounted at different locations on an operator's head to best suit the operator's needs.

Another object of the invention is to provide a method and system for displaying in an FFM having a separate display control module to allow upgrade/additions of sensors and data supplied to a display module without modification to the display module itself.

Another object of the invention is to provide a method and system for displaying in an FFM that avoids the use of mirrors and transparent sheets in the display optical path to reduce the problems associated with condensation (particularly in high humidity diving & firefighting environments) on such surfaces that might otherwise alter magnification and view-ability.

These and other objects of the invention will become more readily apparent from the ensuing specification when taken in conjunction with the appended claims.

Accordingly, the present invention is to a method and system that displays information in a full face mask. A display module is mounted inside the full face mask on faceplate support structure outside of a forward viewing area of a faceplate portion. The display module is located to be free of interference with an operator's forward field of view through the forward viewing area. A display control module is externally mounted on outside components of the full face mask and has a waterproof housing, processing and display driving electronics, memory, internal sensors, external sensors, and battery. A power-data cable is connected to the display control module externally mounted on the full face mask and to the display module inside the full face mask via an accessory interface plate. A switch on the display control module can be accessed and selectably actuated by an operator to present data from the display control module on the display module.

DESCRIPTION OF THE PREFERRED EMBODIMENTS

Figure 1:
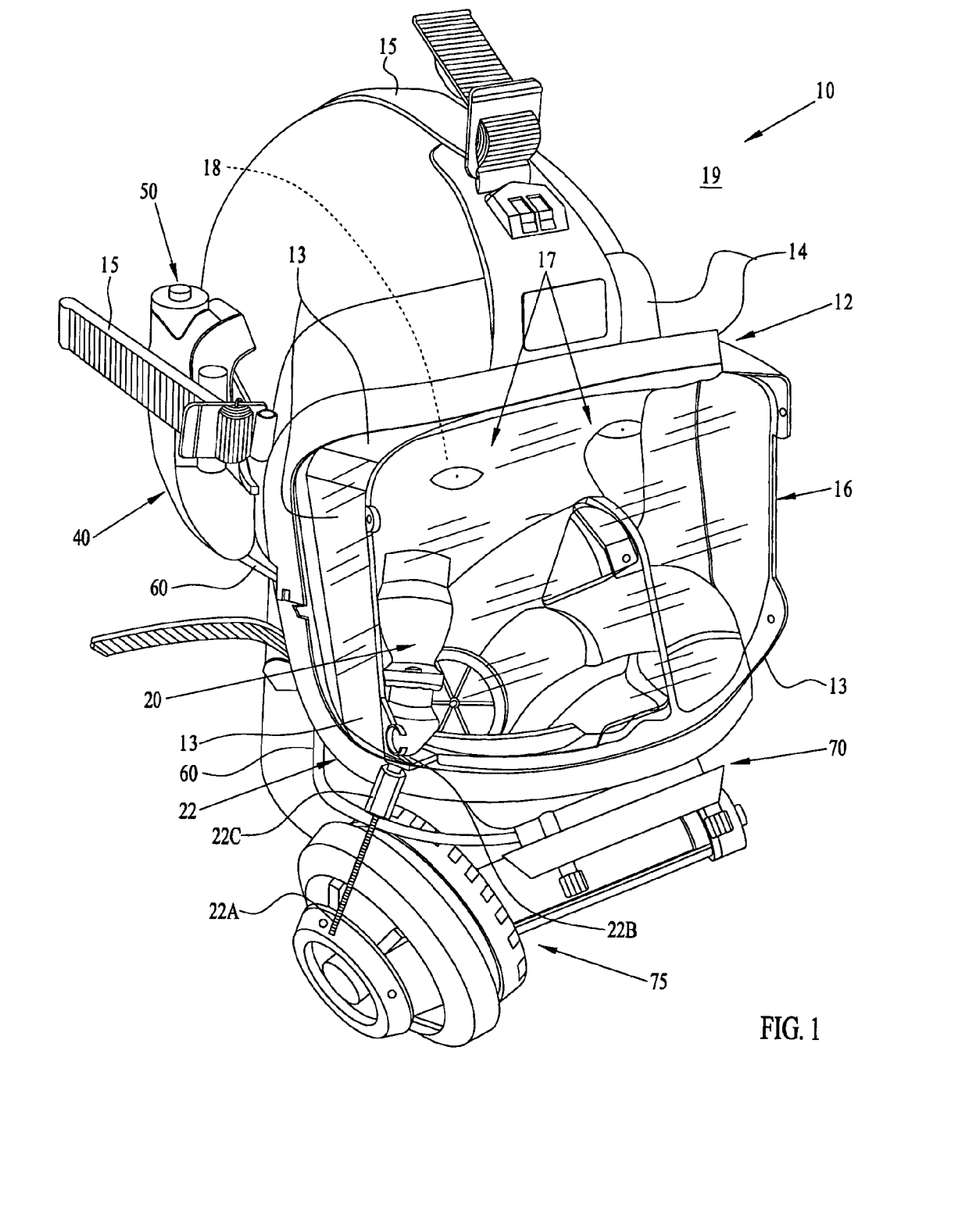
FIG. 1 is an isometric, schematic representation of the display system of the invention being mounted on a diver's or firefighter's full face mask.

Referring to FIG. 1 of the drawings, display system 10 of the invention can be interfaced to modify a full face mask (FFM) 12. FFM 12 can be any of several contemporary designs worn by divers and/or firefighters that assure visibility and protection as they perform dangerous and demanding tasks.

Display system 10 includes a display module 20 and a display control module 40 that can provide essential data (or information) to an operator (e.g., diver or firefighter) regarding life support and other mission essential data. This data comes from multiple data sources and is shown at a single location on display module 20 located inside 18 of FFM 12. Display control module 40 of display system 10 also can be at a single location outside 19 of FFM 12 on outside components that include faceplate support structure 13 that has an elastomeric lip 14 that can combine with straps 15 and other compliant portions to rest and seal against bony contours around the facial area. Faceplate support structure 13 also positions a faceplate portion 16 in front of an operator's forward-viewing area 17 to allow an operator to see and perform tasks effectively. Faceplate support structure 13 of FFM 12 can be made of the same clear material as faceplate portion 16 or can be opaque rubber-like material that has sufficient strength to also support display module 20.

Display module 20 is mounted to extend through faceplate support structure 13. The place where display module 20 is located is below and off to the side or other convenient place on faceplate support structure 13 that is peripheral to the operator's forward viewing area 17. This peripheral location of display module 20 permits an operator to merely rotate the eyes to the side to see data from multiple sources in a single location in FFM 12 regardless of environmental conditions and the operator's physical constraints and without substantially obstructing the operator's forward field of view.

In accordance with this invention display system 10 can be used to upgrade other commercially available FFMs 12 of similar design that are used for diving and firefighting. For example display system 10 can be retro-fitted to the commercial off-the-shelf FFM 12 known as the DIVATOR MK II marketed by INTERSPIRO and sold and marketed by a number of companies, distributors, and manufacturer's representatives worldwide.

Figure 2:
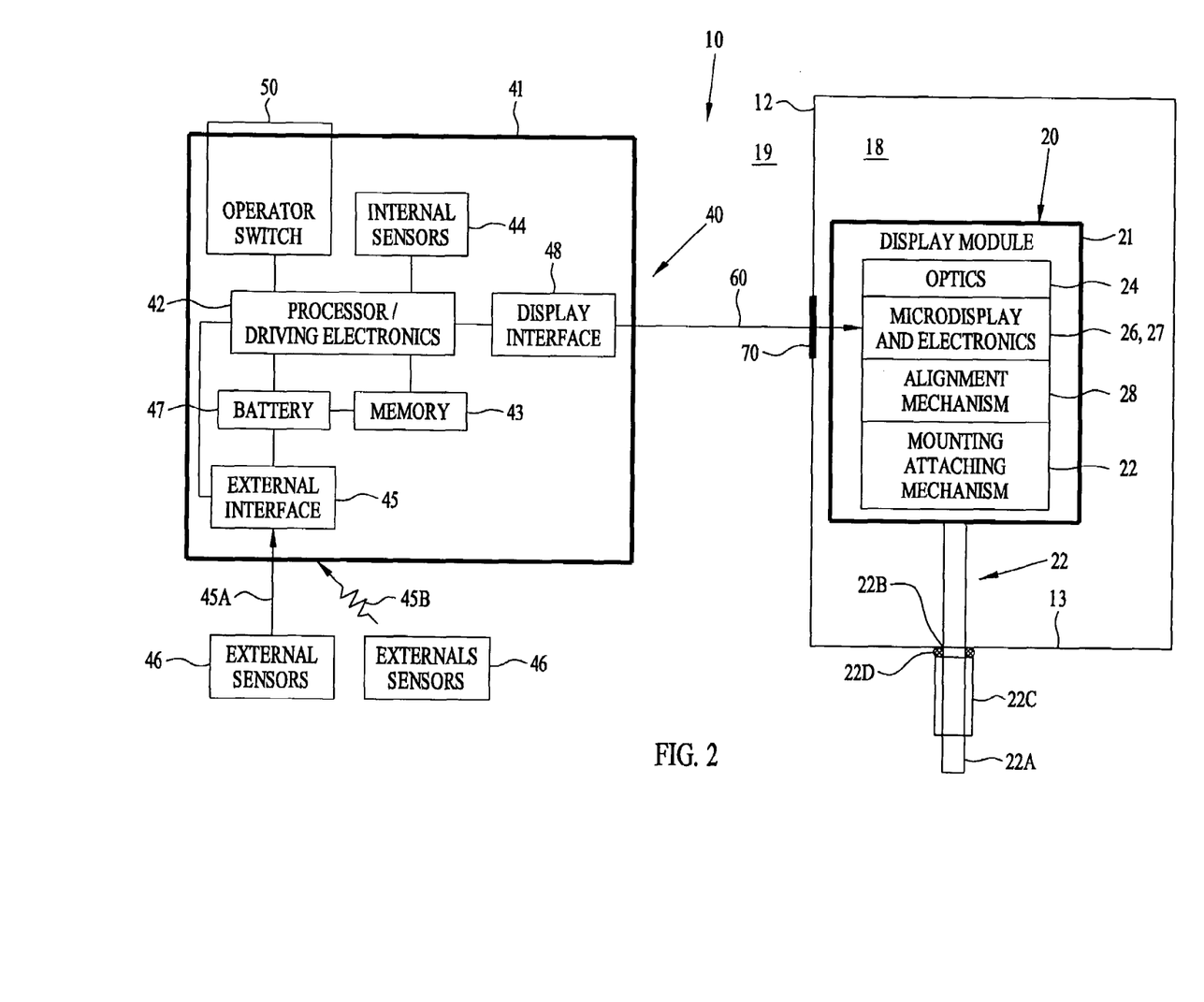
FIG. 2 is a schematic representation of constituents of the display system of the invention.
Figure 3:
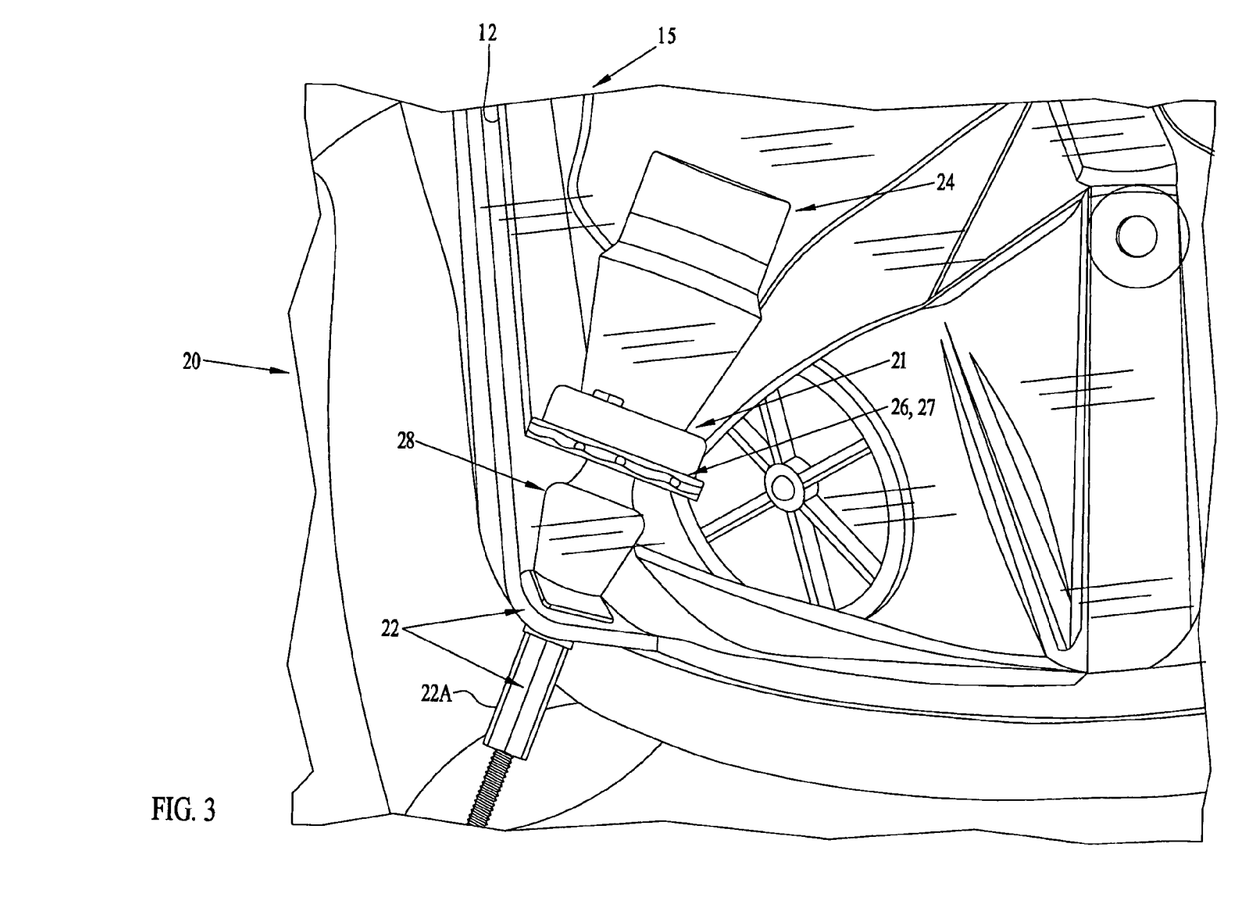
FIG. 3 shows a magnified external view of a display module mounted on a full face mask.
Figure 4:
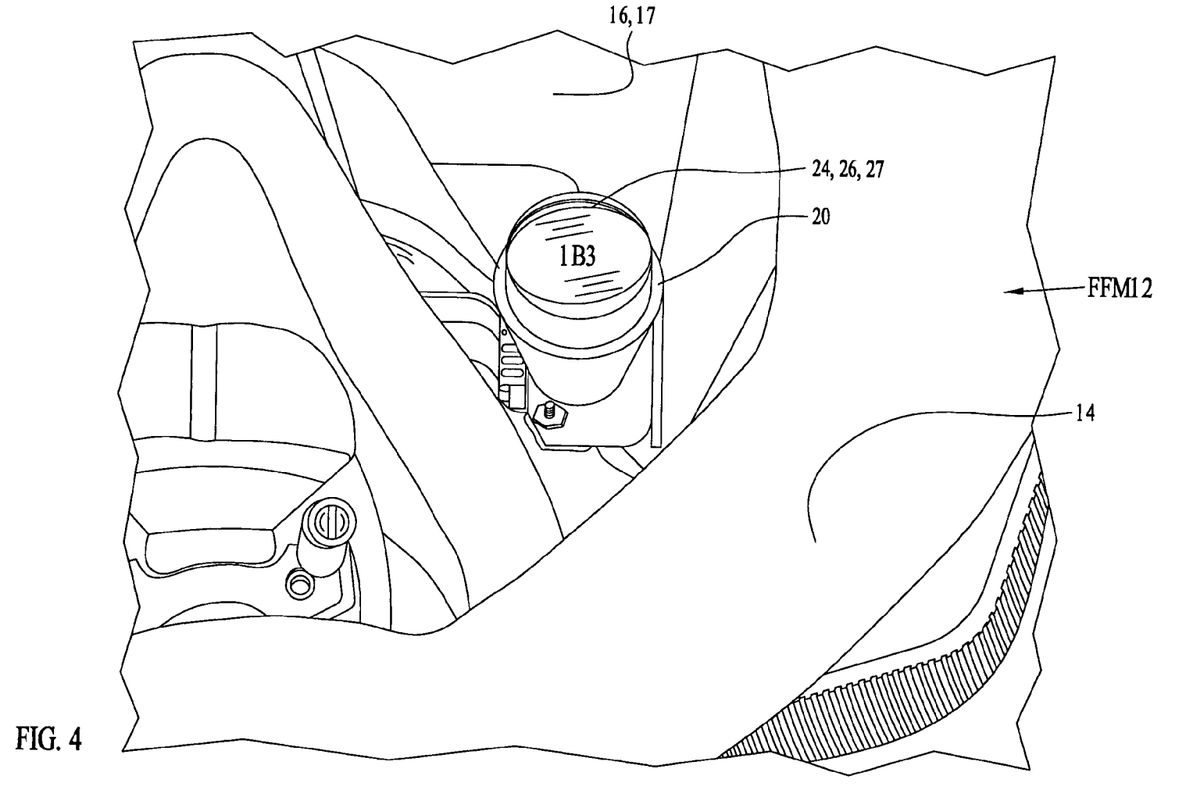
FIG. 4 shows an internal view of the display module of FIG. 3

Referring also to FIGS. 2, 3, and 4, display module 20 of display system 10 has a waterproof housing 21 mounted inside of FFM 12 by a mounting mechanism 22 that extends through the lower right front part of faceplate support structure 13. Mounting mechanism 22 has a threaded rod 22A that extends thru a hole 22B drilled in faceplate support structure with a securing nut 22C on the outside. Hole 22B can be sealed by mechanical means (i.e. an O-ring 22D) to prevent water leaking into the mask. Display module 20 can be detached by removing nut 22C and pulling display module 20 out of FFM 12 from the inside. The remaining hole 22B can be sealed using an appropriate mechanical sealing method. In this way the operator can add or remove display module 20 as needed.

Housing 21 of display module 20 contains optics 24, a micro-display/electronics section 26 having a micro-screen 27, and optical alignment-adjustment mechanism 28 on mounting mechanism 22. Typically, adjustment-alignment mechanism 28 can be a 'ball-and-socket' swivel mount, sometimes called a 'gimble-mount' in the industry. These components are arranged in a compact water-tight package that allows an operator wearing FFM 12 to easily view a magnified virtual image of data on micro-display/electronics section 26. Since display module 20 is peripherally located inside the lower right (or left) corner on faceplate support structure 13 of FFM 12, the data presented on micro-screen 27 of micro-display/electronics section 26 is free of interference with an operator's forward field of view through forward viewing area 17 in face plate portion 16.

The type of micro-screen 27 of micro-display/electronics section 26 that is used is dependent on the data required by the operator or available for a job at hand. A custom segmental liquid crystal display (LCD) could be selected or a monochrome or color 1/4 VGA, VGA. In this context, the term VGA refers to an industry standard display resolution of 640×480 pixels (horizontal and vertical); 1/4 VGA refers to a 320×240 display resolution format; SVGA refers to 800×600 pixel resolution. In addition, the display of data is not limited to liquid crystal Display (LCD) technology but could also be light emitting diode (LED) or electro-luminescent (EL) or video display as well. Optics 24 can include several lenses that make micro-screen 27 appear highly magnified at an apparent distance of typically ten to twelve inches from the operator's eye. Digital alpha-numeric characters typically appear to be about one-half inch in height which is easily readable even when reading glasses are worn, see characters "1 B 3" on as they appear from micro-screen 27 through optics 24 in FIG. 4. Micro-screen 27 can be illuminated (back-lighted); however if LCD, LED or EL displays are used, no additional backlighting is needed. Alignment mechanism 28 of display module 20 is accessible from inside 18 of FFM 12 by the operator to allow corrections of optical alignment with the operator's right eye.

Figure 5:
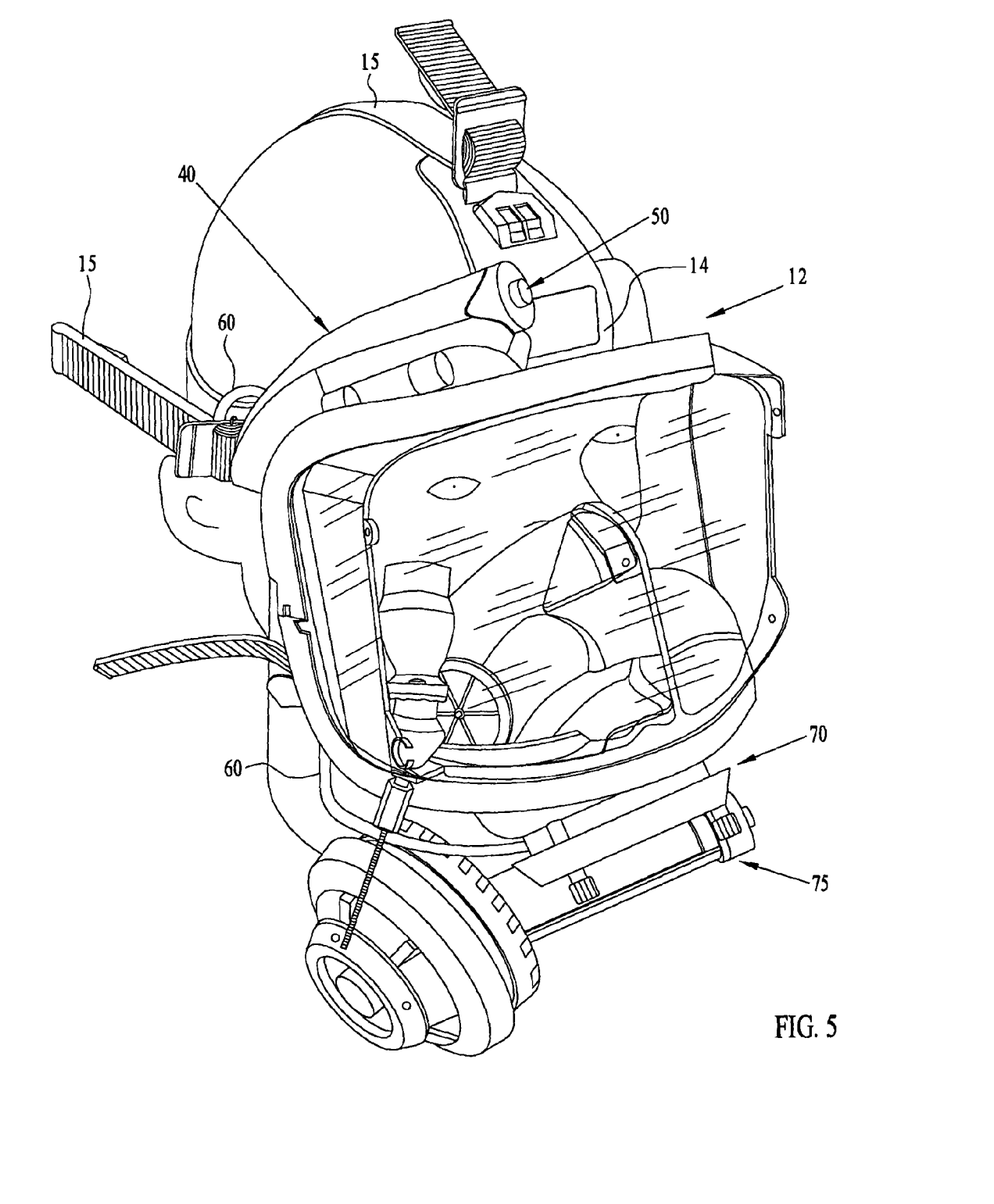
FIG. 5 is a schematic representation of another location of the display control module of the display system on a face mask.
Figure 6:
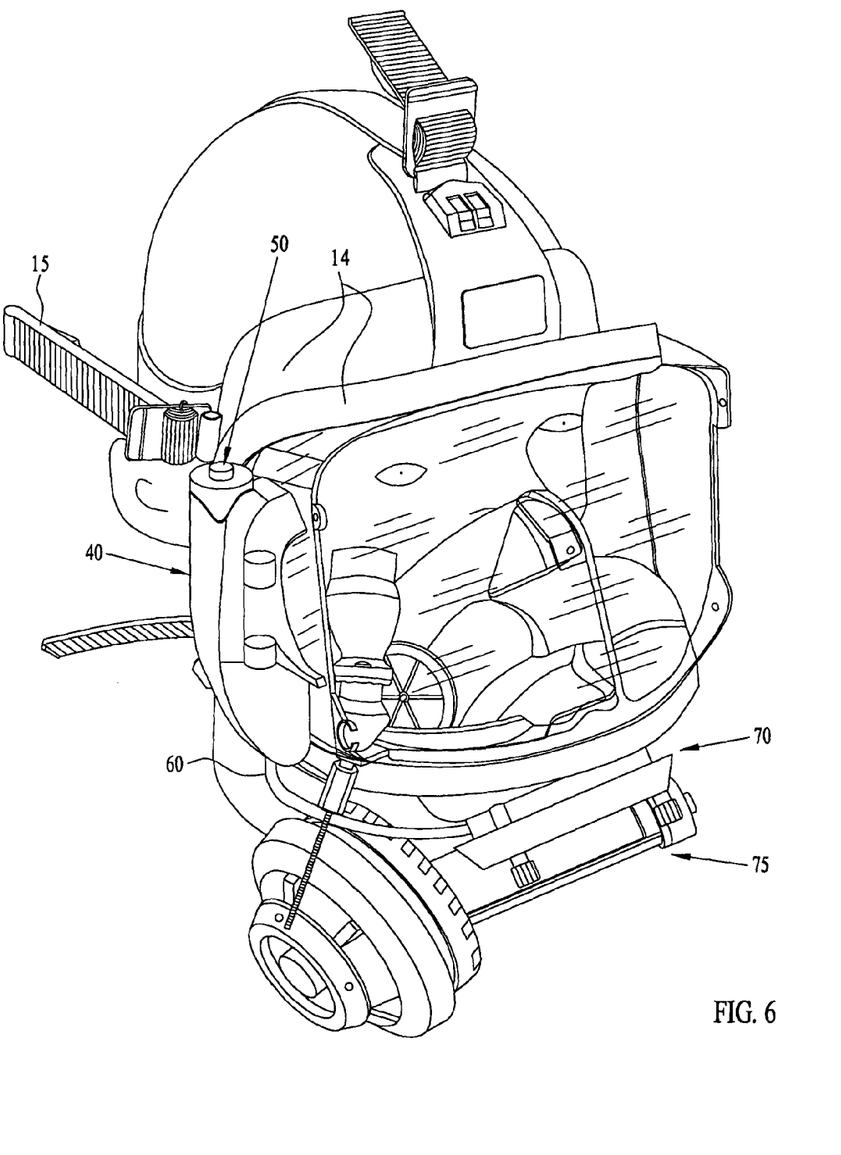
FIG. 6 is a schematic representation of yet another location of the display control module of the display system on a face mask.

The data, or information presented for viewing by display module 20 is supplied by a display control module 40 that can be remotely located on the operator's head at various locations on the outside components of FFM 12 as shown in FIGS. 1, 5 and 6. These outside components of FFM 12 include faceplate support structure 13, mask straps 15, and compliant portions including an elastomeric lip 14. FIG. 1 shows control display module 40 with control switch 50 strapped and/or adhered on the outside component of strap 15 on the right side of the head; FIG. 5 shows control display module 40 with control switch 50 adhered to the outside component of elastomeric lip 14 and associated compliant structure above the forehead; and FIG. 6 shows display control module 40 with control switch 50 strapped and/or adhered on faceplate support structure 13, elastomeric lip 14 and strap 15 on the right side of the head. Display control module 40 can be located anywhere within arms reach on FFM 12 to allow access to operator switch 50 on display control module 40.

From display control module 40 externally mounted on FFM 12 a power-data cable 60 is routed to display module 20 inside FFM 12 via an accessory interface plate 70 at the chin area of FFM 12. Accessory interface plate 70 has been modified to seal the pass-through by cable 60 against any differential pressure that might otherwise create leakage between interior 18 of FFM 12 and ambient water or air at exterior 19 outside of FFM 12. A second stage 75 of a SCUBA regulator interfaces FFM 12 at accessory interface plate 70.

Display control module 40 can include a waterproof housing 41, processing and display driving electronics 42, data storage or memory 43, internal sensors 44, electronic interface 45 to support wireless and hardwire links 45A, 45B to remote or external sensors 46, operator switch 50, a user replaceable battery 47 and display interface 48 to couple power and data to cable 60. Operator switch 50 on display control module 40 can be used to control on/off of display system 10, on/off and brightness of display module 20, content of display shown on micro-screen 27 of micro-display/electronics display 26, and timing functions of displayed data.

Display control module 40 can supply display module 20 with display data from a number of sources as represented by internal sensors 44, memory 43, and external sensors 46. Data in the form of maps, schematics, detailed technical data, etc. can be pre-loaded by the operator and stored in local memory 43. Data can be provided from internal sensors 44 that can be used to monitor environmental parameters and status of display system 20 such as depth, temperature, magnetic field strength (for determining azimuth or compass heading), gas concentrations, battery status, operating time, etc. Data can also be provided from external sensors 46 used to monitor life support system parameters such as tank pressures of interconnected breathing gases, oxygen "partial pressure" and data from operator tools (i.e. navigation systems, sonars, thermal imagers, cameras, GPS inputs, etc.). These different data can be connected to display control module 40 by hardwire and/or wireless connection using a standard RF transmission electronics. Display control module 40 processes the data for presentation and selection by the operator by predetermined numbers of displacements, or actuations of push-button control switch 50 that initiates presentation of the selected data on micro-screen 27 in display module 20. The processing capabilities of display processor and driving electronics 42 of display control module 40 can also be used to take combinations of memory and/or inputs from internal and external sensors 44, 46 and calculate the display of other relevant data (i.e. compute diver decompression status from depth and time, or present the position of the operator using an internal map database and GPS inputs).

In light of the teachings disclosed herein, the components of display module 20 and display control module 40 of display system 10 and their interconnection can be fabricated by the exercise of ordinary skill by one having ordinary skill in the art. U.S. Pat. No. 6,447,115 shows a display system made as an integral part of a specifically designed face mask that partially covers a wearer's face. Another specifically made face mask shown in U.S. Pat. No. 5,764,203 has a display that blocks-off a considerable frontal area and possibly interferes with a wearer's forward view. These masks, though noteworthy in some respects, are fabricated by procedures that create face mask platforms of two specific designs and do not suggest a procedure for modification of existing face masks with display module 20 and display control module 40 of display system 10 as disclosed herein.

Figure 7:
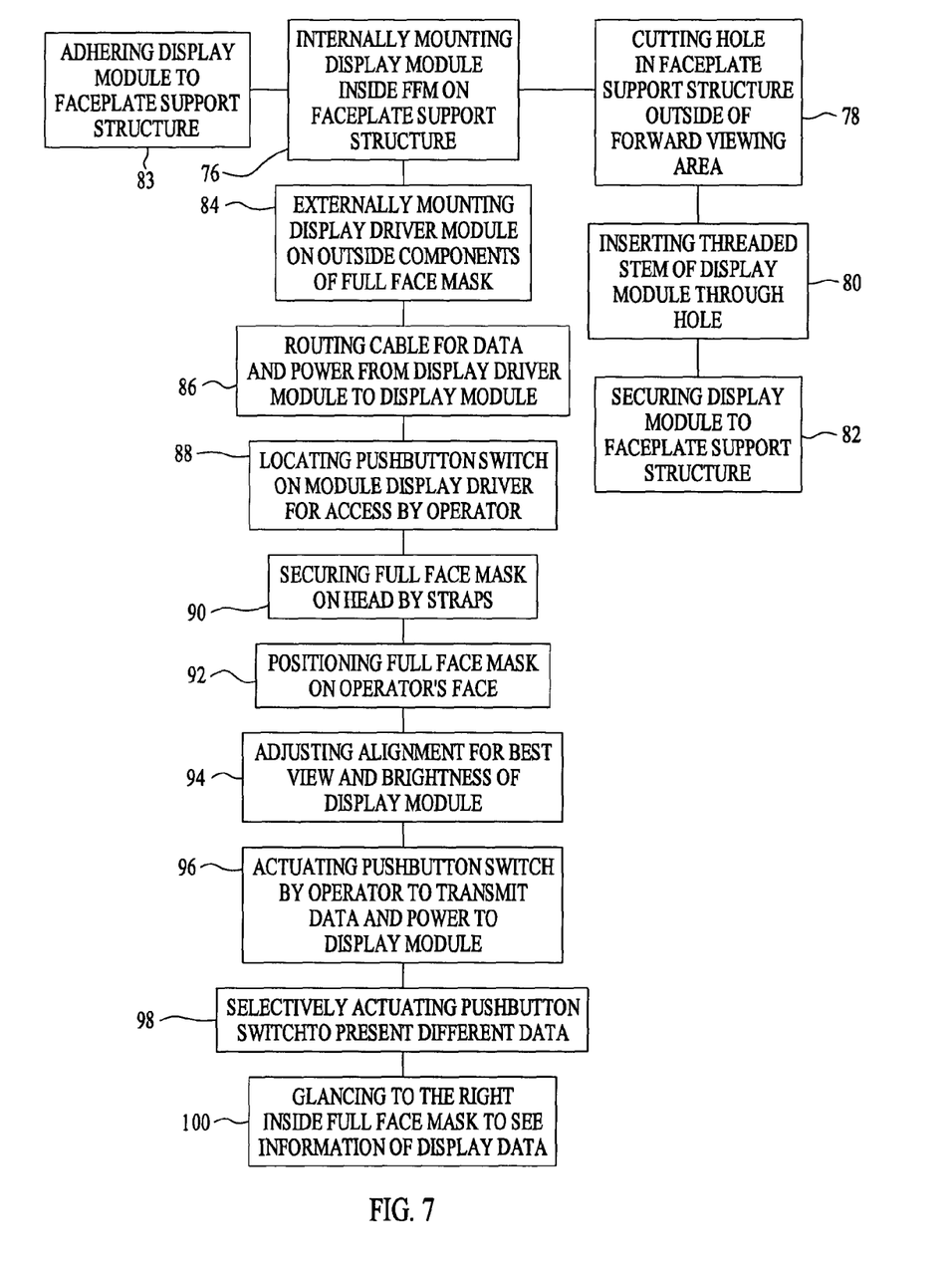
FIG. 7 schematically depicts the method of the invention.

Referring to FIG. 7, the method of displaying data of display system 10 in an existing FFM 12 requires internally mounting 76 display module 20 on inside 18 of FFM 12 in the lower right (or left) corner on faceplate support structure 13. The internally mounting 76 includes cutting 78 of hole 22B in faceplate support structure 13 at lower right (or left) corner of FFM 12 or any other part of FFM 12 outside of forward viewing area 17 of faceplate 16 where display module 20 is desired to be placed. Inserting 80 display module 20 to have threaded stem 22A of mounting mechanism 22 extend through cut hole 22B allows securing 82 of display module 20 to faceplate support structure 13 in FFM 12 by threaded nut 22C of mounting mechanism 22 tightened onto threaded stem 22A. Optionally, internally mounting 76 display module 20 in the lower right (or left) corner of FFM 12 can be done by adhering 83 display module 20 to faceplate support structure 13 by securely mount a permanent base (not shown) for display module 20 inside FFM 12. Display module 20 can then be mounted to or demounted from this base as required by the operator.

Externally mounting 84 display control module 40 on the outside of FFM 12 is on either of or a combination of outside components of FFM 12 including faceplate support structure 13, mask straps 15, and compliant portions including an elastomeric lip 14. Routing 86 cable 60 conveys data and power from display control module 40 to display module 20 inside of FFM 12 via accessory interface plate 70. This external mounting 84 provides for locating 88 of push-button switch 50 on externally mounted display control module 40 for convenient access by the operator.

Securing 90 FFM 12 on the head and face by straps 15 permits positioning 92 of FFM 12 on the operator's face like it would be during actual operations and adjusting 94 alignment of components of display module 20 for the best view of micro-display 26 and brightness of micro-display 26 via operator push-button switch 50. Actuating 96 push-button switch 50 by the operator transmits power and data to display module 20.

Selectively actuating 98 push-button switch 50 by the operator can cause data from different sources to be shown on micro-screen 27. These sources can include the stored data from internal memory 43 in display control module 40, internal data from internal sensors 44 in display control module 40 and external data from sensors outside display control module 40. Glancing 100 down and slightly to the right inside of FFM 12 by the operator to see and immediately appraise the information of the displayed data without detracting from observable phenomena through forward viewing area 17 of faceplate portion 16.

Having the teachings of this invention in mind, modifications and alternate embodiments of display system 10 may be adapted without departing from the scope of the invention. Display system 10 could have different combinations of sensor packages and communication systems as well as other navigational systems. Display system 10 provides a completely enclosed display module 20 and low profile external display control module 40 on FFM 12 that protect hardware and reduce chances of snagging as compared to contemporary bulky, externally mounted display systems. Display system 10 has an adjustable optical alignment feature of display module 20 to accommodate for anthropometrical differences between operators [i.e. variety of face shapes and sizes which affect mask fit, as well as varying interpupillary distances for different operators]. Display system 10 has a relatively small sized display module 20 peripherally placed inside 18 of FFM 12 to minimally interfere with an operator's field of view, and display control module 40 can be mounted in a variety of locations outside 19 of FFM 12 to best suit the needs of the operator. Display system 10 of the invention can be retrofitted to current state of the art FFMs or supplied as a kit to upgrade mask capabilities. Separate display control module 40 allows upgrade/additions of sensors 44, 46 and other stored data without modifications of display module 20.

The disclosed components and their arrangements as disclosed herein, all contribute to the novel features of this invention. Display system 10 provides an operator with viewable data in FFM 12 from multiple sources outside of FFM 12 and is free of interference with forward viewing to permit unimpeded observation for successful completion of tasks. Therefore, display system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A method of displaying information in a full face mask comprising the steps of:
   internally mounting a display module inside a full face mask on faceplate support structure outside of a forward viewing area of a faceplate portion to be free of interference with an operator's forward field of view through said forward viewing area of said faceplate portion, wherein said step of internally mounting said display module comprises the steps of:
   cutting a hole in said faceplate support structure;
   inserting a threaded stem of a mounting mechanism of said display module to extend through said hole; and
   securing said display module in said full face module by a threaded nut tightened onto said threaded stem;
   externally mounting a display control module on outside components of said full face mask;
   locating a push-button operator switch on said externally mounted display control module for access by an operator;
   routing a power-data cable from said display control module externally mounted on said full face mask to said display module inside said full face mask via an accessory interface plate; and
   selectively actuating said switch to present data from said display control module on said display module.

2. The method of claim 1 wherein said step of externally mounting comprises externally mounting said display control module on any one of said faceplate support structure, mask straps, and an elastomeric lip of said full face mask.

3. The method of claim 2 further comprising the step of:
   selectively actuating said push-button switch to present different data for said display module.

4. The method of claim 3 further including the steps of:
   securing said full face mask on the head and face by said mask straps;
   positioning said full face mask on an operator's face as it would be during actual operations; and
   adjusting alignment of components of said display module for the best view and brightness of said micro-display by said push-button switch.

5. The method of claim 4 wherein said display module has a waterproof housing containing optics, a micro-display/electronics section having a micro-screen, an optical alignment-adjustment mechanism permitting viewing of a magnified virtual image of data on said micro-screen of said micro-display/electronics section, and said data is presented on said micro-display screen of said micro-display/electronics section free of interference with an operator's forward field of view through said forward viewing area in said face plate portion, and said display control module has a waterproof housing, processing and display driving electronics, memory, internal sensors, external sensors, and battery.

6. The method of claim 5 wherein said operator switch on said display control module controls on/off operation of said display module and said display control module system, brightness and content of said data on said micro-screen of said micro-display/electronics section, and timing functions of displayed data.

7. A system for displaying information in a full face mask comprising:
   a display module internally mounted inside a full face mask on faceplate support structure outside of a forward viewing area of a faceplate portion, said display module being located to be free of interference with an operator's forward field of view through said forward viewing area in said faceplate portion, wherein said display module has a mounting mechanism extending through a hole provided in said faceplate support structure to receive a threaded stem of said mounting mechanism of said display module inserted through said hole and be secured to said full face mask by a threaded nut of said mounting mechanism tightened onto said threaded stem;
   a display control module externally mounted on outside components of said full face mask, said display control module having a waterproof housing, processing and display driving electronics, memory, internal sensors, external sensors, and battery;
   a power-data cable connected to said display control module externally mounted on said full face mask and to said display module inside said full face mask via an accessory interface plate on said full face mask; and
   a push-button operator switch on said externally mounted display control module for actuation by an operator and selective display of data on said display module.

8. The system of claim 7 wherein said display control module is externally mounted on any one of said outside components including said faceplate support structure, mask straps, and an elastomeric lip of said full face mask.

9. The system of claim 8 wherein said display module has a waterproof housing containing optics, a micro-display/electronics section having a micro-screen, an optical alignment-adjustment mechanism permitting viewing of a magnified virtual image of data on said micro-screen of said micro-display/electronics section, and said information is presented on said micro-display screen of said micro-display/electronics section free of interference with an operator's forward field of view through said forward viewing area in said face plate portion.

10. The system of claim 9 wherein said operator switch on said display control module controls on/off operation of said display module and said display control module system, brightness and content of said data on said micro-screen of said micro-display/electronics section, and timing functions of displayed data.

* * * * *